United States Patent [19]

Aleite et al.

[11] 4,046,624

[45] Sept. 6, 1977

[54] METHOD OF OPERATING A NUCLEAR REACTOR

[75] Inventors: Werner Aleite; Heinz-Wilhelm Bock, both of Erlangen, Germany

[73] Assignee: Siemens Aktiengesellschaft, Munich, Germany

[21] Appl. No.: 501,352

[22] Filed: Aug. 28, 1974

[30] Foreign Application Priority Data

Sept. 17, 1973 Germany .............................. 2346725

[51] Int. Cl.² .............................................. G21C 7/08
[52] U.S. Cl. ......................................... 176/22; 176/24
[58] Field of Search ................. 176/19 R, 19 EC, 22, 176/24, 36 R, 20 R

[56] References Cited

U.S. PATENT DOCUMENTS

| | | | |
|---|---|---|---|
| 3,202,804 | 8/1965 | Schlein | 176/24 |
| 3,424,653 | 1/1969 | Cohn | 176/19 EC |
| 3,565,760 | 2/1971 | Parkos et al. | 176/24 |
| 3,625,816 | 12/1971 | Aleite et al. | 176/36 R |
| 3,632,471 | 1/1972 | Traube et al. | 176/36 R |
| 3,706,921 | 12/1972 | Rosen | 176/22 |
| 3,778,347 | 12/1973 | Giras et al. | 176/24 |
| 3,780,292 | 12/1973 | Klar | 176/19 R |
| 3,849,637 | 11/1974 | Caruso et al. | 176/20 R |

OTHER PUBLICATIONS

"Principles of Nuclear Reactor Engineering," Glasstowe, Van Nostrand Co., (1955) p. 324–327.
"Introduction to Nuclear Reactor Theory," John R. Lamarsh, Addison-Wesley Publishing Co., Inc., Reading, Mass. (1966).

*Primary Examiner*—Samuel W. Engle
*Assistant Examiner*—S. A. Cangialosi
*Attorney, Agent, or Firm*—Kenyon & Kenyon, Reilly, Carr & Chapin

[57] ABSTRACT

A pressurized-water reactor with a core height of at least 3.5 m, is operated by using at least 50 measuring probes which are distributed throughout the core and which feed into a computer. The latter computes in advance a program of operation, by which individual control rods are adjusted, regardless of load changes, over the height of the core in such a manner that local power peaks are avoided.

6 Claims, 5 Drawing Figures

METHOD OF OPERATING A NUCLEAR REACTOR

BACKGROUND OF THE INVENTION

The invention concerns the operation of a nuclear reactor, particularly a pressurized-water reactor, with measuring probes for measuring the power density in the reactor core, and with control rods which are adjustable in the core for the purpose of power output control, individually or sequentially in groups, for maintaining a uniform power distribution over the cross section of the core. According to the German Auslegeschrift No. 1,244,307, such a nuclear reactor is equipped with rods of structurally uniform design, which are moved in dependence on the magnitude of the controlling signal individually or in groups, in steps and in cyclic sequence. The cyclic sequence, i.e., the number and local distribution of the control rods operated at a time, is determined by a program which is intended to provide a definite profile of the power distribution as a function of the depth of immersion of the control rods.

However, particularly in nuclear reactors of very large output of, for instance, 1200 MWe, uneven power distribution can result in such operation from the fact that local xenon poisoning reduces the power in individual parts of the reactor core. This can even excite oscillations in the power distribution, which lead to local overheating in the core even if the overall output of the nuclear reactor remains constant. It is therefore an object of the invention to find a method of power control for such nuclear reactors of large output, which takes the local power density into consideration in a better manner.

SUMMARY OF THE INVENTION

According to the invention, it is provided that in a reactor core with a core height of 3.5 m or more, at least 50 measuring probes are distributed; that at least 50 control rods are adjustable over the height of the core, which rods have uniformly low reactivity; and that a computer is connected to the measuring probes, which computes from their measured values in advance, taking into consideration burn-up and the xenon poisoning, a program of operation, by which also, independently of power changes, individual control rods or small groups of control rods of at least 10 control rods are adjusted over the height of the core in an irregular sequence in such a manner that local power peaks are avoided.

With this invention, no fixed sequence for actuating the control rods is therefore provided, which is automatically repeated under the same circumstances. With the overall power output given, the control rods are instead adjusted on the basis of the respective power distribution determined by means of the measuring probes. Not only the instantaneous value of the local power is taken into consideration here, but also the xenon poisoning resulting from this power distribution, which manifests itself only during the further operation in the course of several hours. Adjusting the control rods in an irregular sequence means that individual control rods or small control rod groups can be interchanged, depending on the local power, also without change in the overall power, i.e., some of them are withdrawn and the others inserted, so that the most uniform possible power distribution is obtained. As viewed over the entire core, the control rods are therefore slightly in motion practically continuously, in order to avoid a local power level which deviates for any length of time from the average power of the core, such as is a condition for local xenon poisoning.

Particularly advantageous is an embodiment of the invention, in which the control rods are dual control rods known per se, which in addition to control rods comprise shutdown rods. Here, the reactivity of the control rods can be kept particularly small, so that the very small reactivities used for compensating xenon poisoning do not disturb the uniform power distribution. The control rods therefore are then so-called grey control rods with a reactivity of 0.05 to 0.005%. For the always required facility to shut down the reactor quickly, the shutdown rods are used which, however, can be withdrawn from the reactor core by the drives of the dual control rods, as is described, for instance, in the German Offenlegungsschrift No. 2,044,303. The shutdown rods have a substantially greater reactivity of, for instance, 0.1 to 0.02%. In normal operation, however, they are located completely outside the reactor core, so that a uniform power distribution is not impaired.

As a further advantage, the invention can be realized so that the absorber material extends in all control rods uniformly over practically the entire height of the core. One therefore no longer needs partial rods, which are otherwise used for compensating local irregularities and which hold always part of the neutron flux in the reactor core.

To simplify the computer and its operating program, control rods in the outer core zones can be made adjustable only for load changes. These control rods are therefore not moved by the computer for equalizing the power distribution. One can advantageously exploit the fact here that the power density is smaller anyway in the outer zones than in the central regions of the reactor core because of the scatter effect. In the outer zones it is therefore not important to adjust a uniform power distribution exactly. The irregular actuation of the control rods in accordance with the invention on the basis of the local power density by means of a predictive computer, is then confined to the inner regions of the core, but the number of the control rods shold not be chosen smaller than 50 for this reason.

The computer can be used for controlling the power distribution in such a manner that also load sequence programs can be executed, in which the output of the reactor is determined by the demands of the electrical network that is supplied by the nuclear reactor. It may, however, be advantageous here if the computer can be disconnected, when negotiating steep load ramps, with respect to adjustments, to avoid local power peaks. In that case, the control rods are moved by the computer for a short time only so that the desired power output change in the nuclear energy generation takes place. Only thereafter, when the power demand is again uniform, is the computer switched over. At the new value of the overall output, it then takes care again that uniform loading is maintained over the reactor core by adjustment of the individual control rods as a function of the local power distribution determined by the measuring probes.

BRIEF DESCRIPTION OF THE DRAWINGS

The invention is schematically illustrated by the accompanying drawings, in which.

DETAILED DESCRIPTION OF THE INVENTION

Figure 1:
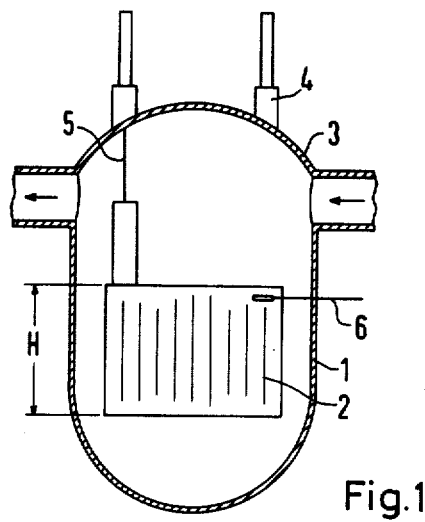
FIG. 1 is a vertical section of a pressurized-water reactor.

In FIG. 1 the reactor pressure vessel 1 of a pressurized-water reactor for 1200 MWe can be seen. It contains a reactor core 2 which is composed of fuel assemblies in a manner known per se and whose height H is 3.8 m. The power developed in the reactor core by nuclear reaction processes is controlled by control rods, of which the magnetic control rod drives 4, mounted on the reactor pressure vessel head 3, can be seen. The control rods 5 have for instance, a silver-indium-cadmium alloy or boron carbide as the neutron absorber, which becomes the more effective, the deeper the control rod is immersed in the reactor core. The local power density, i.e., the power distribution over the reactor core 2, is ascertained by measuring probes 6, which are part of the core internal instrumentation, measure the neutron flux and are distributed over the core as uniformly as possible.

Figure 2:
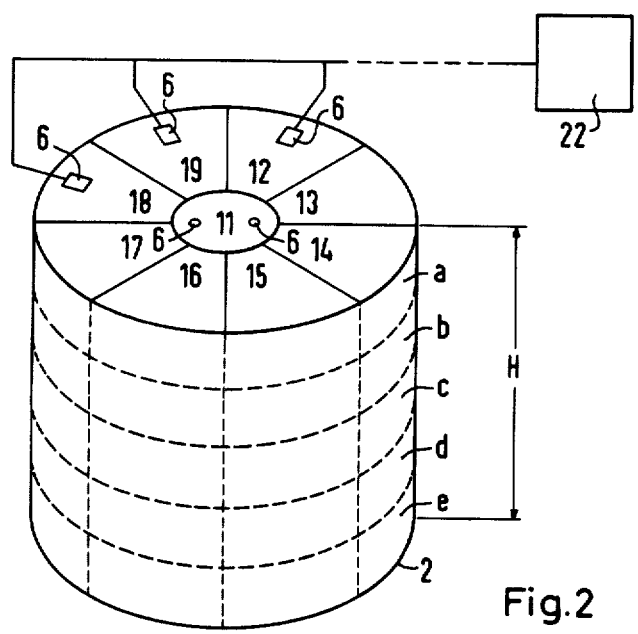
FIG. 2 shows the reactor core as an idealized presentation.

FIG. 2 shows the reactor core 2 in an idealized presentation. It is shown as a cylinder which is subdivided into eight equal segments 12 to 19 which are grouped about a cylindrical center region 11. Each of the sections 11 to 19 is subdivided height-wise (with respect to the height H of the reactor core) into five zones $a$ to $e$, so that a total of 40 individual regions of the core is defined. A measuring probe 6 is arranged in each of these individual regions, as far as the core segments 12 to 19 are concerned. The central region 11 contains in each individual region two measuring probes 6, i.e., a total of 50 measuring probes is provided.

The measuring probes 6 are connected with a central computer 22, which obtains from the measured values the present power distribution over the reactor core 2 and, for instance, prints it out at certain intervals. In addition, however, the computer 22 can also predict from the measured values of the probes 6 the development of the power distribution, taking into consideration the burn-up, xenon poisoning, etc., so that the power distribution at a later point in time, i.e., after several hours, can be foreseen. For this purpose, a diffusion program, for instance, can be used such as has become known under the name "DIDI". DIDI is a one-dimensional computer program for digital computers. With it, the change of the local power distribution can be predicted several hours in advance with sufficient accuracy, which results mainly because of xenon poisoning. On the basis of the results of the computation, the control rods 5 are adjusted so by means of the computer 22 that uniform power distribution over the entire core is obtained, taking into account xenon poisoning and the burn-up that takes place in the course of the operation period, and the control rods retain their effectiveness practically to the same degree without causing excessive power peaks when they are withdrawn. The computer takes automatically into consideration here irregularities in the power distribution, which with the greater core heights of large power reactors, otherwise lead to oscillations in the power distribution.

Figure 3A:
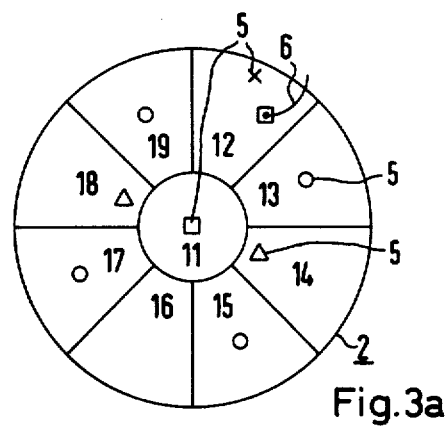
FIGS. 3a to 3c shows various steps in the adjustment of control rods in the core.
Figure 3B:
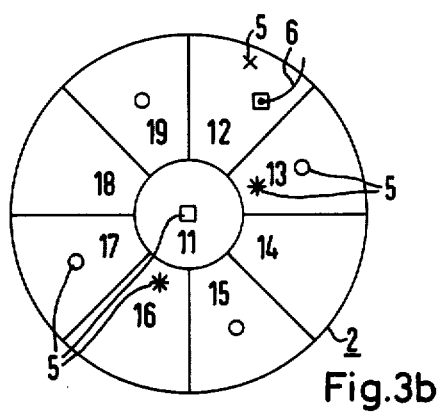
Figure 3C:
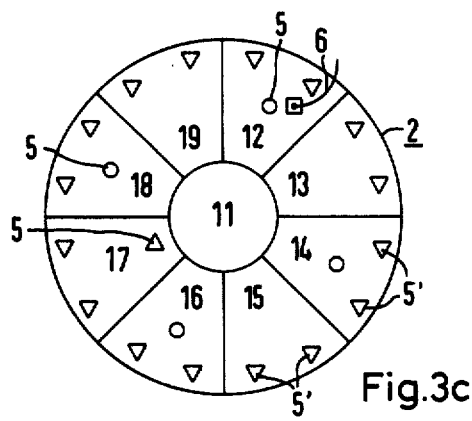

In FIGS. 3a to 3c is indicated schematically, in which manner, for instance, irregular control rod groups must be interchanged by means of the computer in order to achieve the desired effect. In FIG. 3a, the reactor core 2 contains eight control rods 5 for an instantaneous condition with about 80% of rated power, which extend over the entire height of the core and are distributed almost symmetrically. Thus, a uniform power distribution is set for that instant.

At a later point in time, which is shown in FIG. 3b, for instance, an hour later, the control rods, indicated by a triangle, in the segments 14 and 18 are completely withdrawn from the core 2, although the reactor output remains the same with 80% of rated power. Instead, two additional control rods 5, indicated by an asterisk, are completely inserted at another point, namely, in the segments 13 and 16. Again, the power distribution over the core is the same, at the instant as well as for a time determined by the size and the accuracy of the computer 22, e.g., 1 hour.

In FIG. 3c, a different control rod distribution can be seen. Here, the adjustment is to be made not only for uniform power distribution, but also for a reactor output which has been increased from 80 to 90% of the rated power. For this reason, the control rods 5 of the preceding figures are replaced by the new control rod insertion pattern in which a total of only five control rods, for instance, is completely inserted in the reactor core. This position is not retained either, however, as long as the overall output remains the same, but is changed by interchanging rods 5 or groups or rods, as soon as the computer 22 deems this necessary for a uniform instantaneous power distribution and to avoid future local xenon poisoning. It should be emphasized again that in the interchange the height of all the rods 5 situated in the core 2 can definitely also be changed, although one should endeavor in view of axial symmetry, i.e., in the direction of the core height H, to insert effective control rods essentially completely in the core.

In contrast to the computer 22, which has been described as a digital computer above, the invention can also be realized with an analog computer which is less expensive, particularly for smaller power reactors. By the former, the operation program can be determined so that one moves individual control rods in the computer and examines the effect of these measures on the picture of the reactor core 2, which is available in the analog program, for instance, by using the program known as "ANDI". Actually moved are then the control rods 5, which take care in an optimal manner of the uniform power distribution, including the effect of xenon and burn-up.

Only for illustration are further shown in FIG. 3c the control rods 5' in the form of upside-down triangles, which belong to each of the segments 12 to 19 and are provided in the outer zone of the reactor core, and which are moved by the computer 22 only to change the reactor output. The 16 rods 5' are therefore provided in addition to the at least 50 rods 5.

What is claimed is:

1. A method of operating a pressurized water reactor having a reactor core with a core height of at least 3.5 meters and having control rods adjustable for controlling power, the rods being adjustable individually and sequentially in groups so as to maintain a uniform power distribution over the cross section of the core comprising:
   a. subdividing the reactor core both vertically and horizontally into a plurality of at least 50 segments;
   b. disposing a measuring probe for measuring the power density in each of said segments;

c. coupling the outputs of said measuring probes to a computing apparatus;
d. computing in said computing apparatus, from the values measured by said probes, an operating program for the control rods which takes into consideration burn up and zenon poisoning;
e. using control rods which are adjustable over the height of the core and uniformly have only a small reactivity; and
f. coupling the output from said computing apparatus to control said control rods so as to move said rods in groups of between 1 and 10 whereby said control rods will be moved independently of power output changes over the height of the core in an irregular sequence in such a manner that local power peaks are avoided.

2. The method of claim 1 in which the control rods belong to dual control rods which include, in addition to the control rods, shutdown rods.

3. The method of claim 1 in which the absorber material extends in all control rods uniformly over practically the entire height of the core.

4. The method of claim 1 in which further control rods are used in the outer zones of the reactor core which are moved only to change the power output of the core.

5. The method of claim 1 in which the computer is disconnected, when traversing steep load ramps, with respect to the moving of the control rods in order to avoid local power peaks.

6. Apparatus for operating a pressurized water reactor having a reactor core with a core highth of at least 3.5 meters such as to maintain a uniform power distribution over the cross section of the core comprising:
a. at least 50 measuring probes distributed evenly throughout the core and providing as outputs measured values representative of the power density at their respective core section;
b. computing means for computing from said measured values an operating program for control rods which takes into consideration burn up and zenon poisoning, said means providing, as outputs, control signals for control rods;
c. a plurality of control rods adjustable over the height of the core and uniformly having small reactivity;
d. means for positioning groups of control rods, said groups being in the range of 1 to 10, the outputs of said computing means being coupled to said control means, whereby control rods will be positioning independent of power output changes, over the height of the core in an irregular sequence in such a manner that local power peaks are avoided.

* * * * *